UNITED STATES PATENT OFFICE.

EMIL FISCHER, OF BERLIN, GERMANY, ASSIGNOR TO FARBENFABRIKEN VORM. FRIEDR. BAYER & CO., OF ELBERFELD, GERMANY, A CORPORATION OF GERMANY.

ORGANIC IODIN PREPARATION.

No. 858,446.      Specification of Letters Patent.      Patented July 2, 1907.

Application filed January 25, 1907. Serial No. 354,158.

*To all whom it may concern:*

Be it known that I, EMIL FISCHER, professor of chemistry, a citizen of the German Empire, residing at Berlin, Germany, Kingdom of Prussia, have invented new and useful Improvements in Organic Iodin Preparations, of which the following is a specification.

My invention relates to the production of the hitherto unknown esters of the monoiodin substituted derivatives of high-molecular fatty acids which can be obtained by esterification of the monoiodin derivatives of high-molecular fatty acids. The new esters are stable pure iodin preparations. They give off iodin in the organism and have proved to be valuable remedies in medicine, especially for the treatment of venereal diseases. They are specially suitable for subcutaneous use in view of their neutral reaction and absence of irritation. For subcutaneous injections from 2 to 10 grams will serve for a single dose. Clinical experience has shown that the symptoms of iodism are very rarely observed in their administration.

The process for producing the new compounds which possess the following general formula: $C_nH_{2n}I.CO.O.$ alkyl consists in treating the monoiodin derivatives of high-molecular fatty acids with alcohols of the aliphatic series, such as methyl alcohol ethyl alcohol etc. in the presence of strong acids. Under the term monoiodin derivatives of high-molecular fatty acids those acids are generally understood which contain more than about 12 carbon atoms in their molecule, such as monoiodo behenic acid ($C_{22}H_{43}JO_2$), monoiodo stearic acid ($C_{18}H_{35}JO_2$), alpha-monoiodo palmitic acid ($C_{16}H_{31}JO_2$) or the like. The alpha-monoiodo palmitic acid can be obtained by treating the alpha-bromo-palmitic acid with sodium iodid.

My new preparations are partly crystallizable compounds and partly oils. They mix readily with organic solvents, as alcohol, benzene, ligroin, but not with water and are decomposed by treatment with a hot alcoholic solution of caustic potash.

In order to produce my new substances, I can proceed as follows, the parts being by weight: 5 parts of monoiodo behenic acid are heated to boiling with 15 parts of absolute alcohol and 1 part of concentrated sulfuric acid for about 4 hours in a reflux condenser. The mass of the reaction is poured into water and the mixture is shaken with ether which will extract the precipitated oil. The ethereal solution is then separated from the water, shaken with a dilute solution of potassium carbonate to remove unchanged iodo behenic acid and several times washed with water. The ether is driven off and the residue being a light-yellow oil is dried *in vacuo* at 100° C. After cooling to 0 degree C, the new ester solidifies. It can be purified by repeated crystallization from ligroin. The new ester forms white somewhat brilliant miscroscopic prism. melting at 29° C. It contains 25,6% of iodin (theory 25 65%). It is almost odorless and tasteless and practically insoluble in water and is saponified by heating it with an alcoholic caustic potash solution, under the formation of hydroiodic aicd and isoerucic acid, having a melting point of 57 degrees C. The ether is formed according to the following equation:

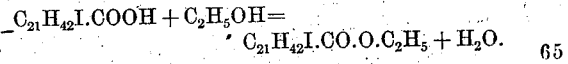
$$C_{21}H_{42}I.COOH + C_2H_5OH =$$
$$C_{21}H_{42}I.CO.O.C_2H_5 + H_2O.$$

The methylic ester is obtained in an analogous way.

The ethylic ester of the monoiodostearic acid is a light-yellow pleasant smelling oil. The ethylic ester of alpha-iodo-palmitic acid is a light reddish-yellow oil of a peculiar odor. The esterification is carried out in an analogous or in any other known manner, if other monoiodo high-molecular fatty acids or other alcohols etc. be used.

Having now described my invention and in what manner the same is to be performed, what I claim as new and desire to secure by Letters Patent is:—

1. The herein-described alkyl-esters of the monoiodin derivatives of high-molecular fatty acids of the following general formula: $C_nH_{2n}I.CO.O.$alkyl, obtainable by esterification of the high-molecular monoiodo fatty acids, which esters are practically insoluble in water and soluble in benzene, alcohol and ligroin, being decomposed by treatment with a hot alcoholic potash solution under the formation of hydroiodic acid, and being valuable remedies, substantially as described.

2. The herein-described new alkyl-esters of the monoiodo behenic acid of the general formula: $C_{21}H_{42}I.CO.O.$alkyl, obtainable by the esterification of monoiodo behenic acid, which esters are practically insoluble in water and soluble in benzene, alcohol and ligroin, being decomposed by treatment with a hot alcoholic potash solution under the formation of hydroiodic acid and isoerucic acid, and being valuable remedies, substantially as described.

3. The herein-described new ethylic ester of monoiodo behenic acid of the formula: $C_{21}H_{42}I.CO.O.C_2H_5$, obtainable by treating monoiodo behenic acid with ethyl alcohol and sulfuric acid, which forms white microscopic prisms, melting at 29 degrees C., being almost tasteless and odorless, being saponified by the action of a hot alcoholic caustic potash solution under the formation of hydroiodic acid and isoerucic acid, and being a valuable remedy, substantially as described.

In testimony whereof I have hereunto set my hand in the presence of two subscribing witnesses.

EMIL FISCHER.

Witnesses:
  WOLDEMAR HAUPT,
  HENRY HASPER.